Feb. 11, 1947.  T. F. RAINSFORD  2,415,533
SPRING SUSPENSION FOR VEHICLES
Filed March 18, 1943  5 Sheets-Sheet 1

INVENTOR.
Thomas F. Rainsford
BY Barnes, Kisselle, Laughlin & Raisch
Attorneys.

Feb. 11, 1947.  T. F. RAINSFORD  2,415,533
SPRING SUSPENSION FOR VEHICLES
Filed March 18, 1943   5 Sheets-Sheet 2
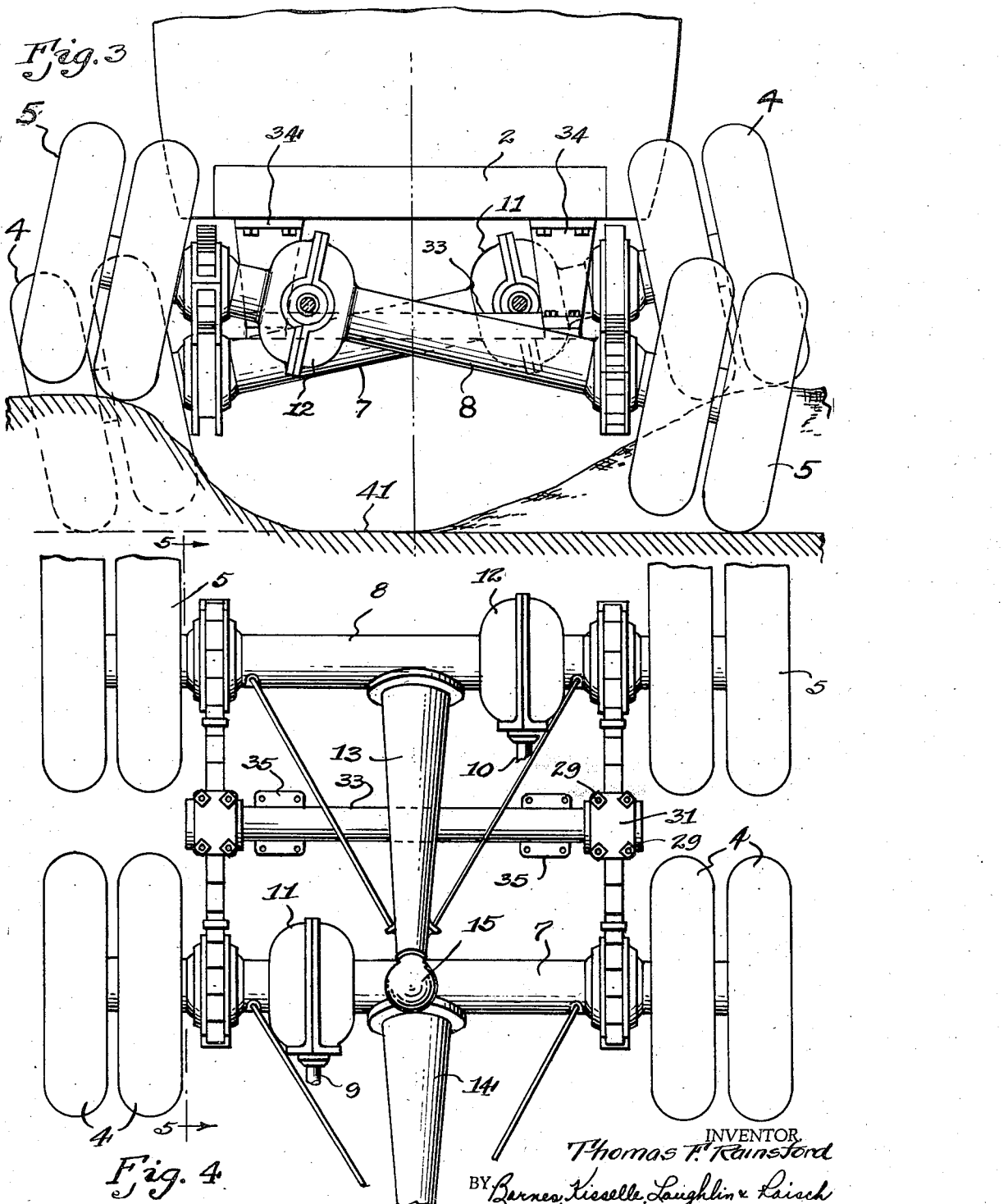

Feb. 11, 1947.  T. F. RAINSFORD  2,415,533
SPRING SUSPENSION FOR VEHICLES
Filed March 18, 1943  5 Sheets-Sheet 3
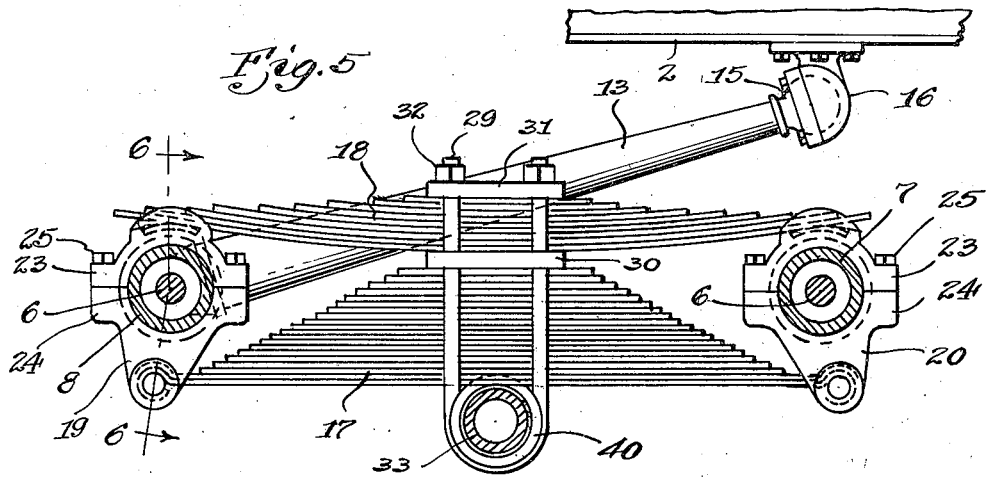
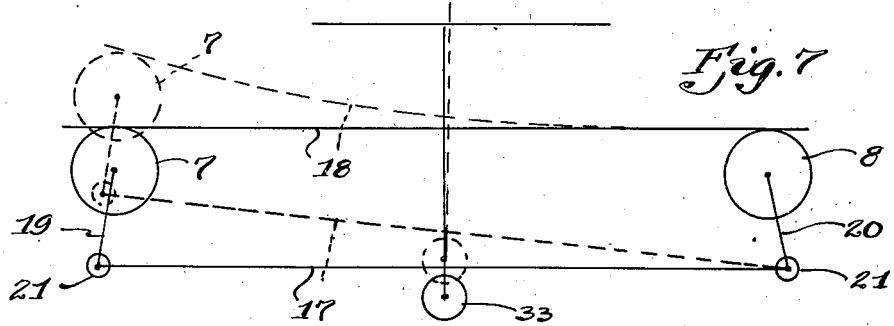
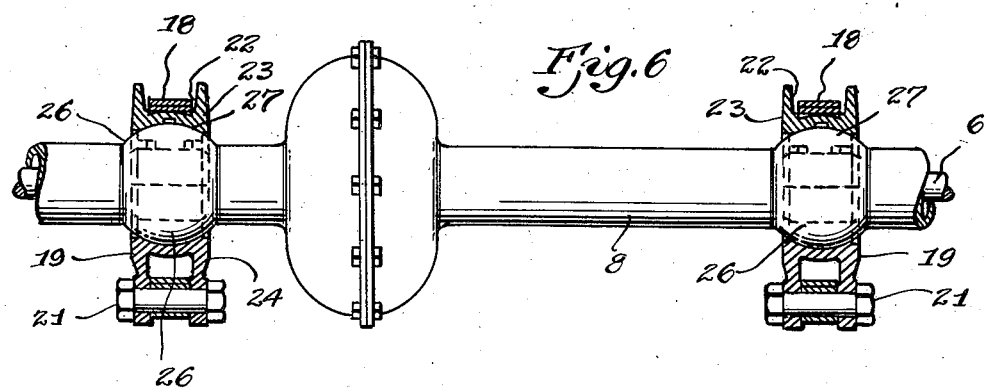
INVENTOR.
Thomas F. Rainsford
BY Barnes, Kisselle, Laughlin & Raisch
Attorneys.

Patented Feb. 11, 1947

2,415,533

UNITED STATES PATENT OFFICE 2,415,533

SPRING SUSPENSION FOR VEHICLES

Thomas F. Rainsford, Detroit, Mich., assignor of one-half to Lloyd Lawson, Dearborn, and one-half to Anthony J. D'Anna, Wyandotte, Mich.

Application March 18, 1943, Serial No. 479,581

14 Claims. (Cl. 280—104.5)

This invention relates to a spring suspension for a vehicle.

It is old in automotive vehicles to suspend the vehicle frame, particularly at the rear thereof, on a four wheel spring suspension, that is, two wheels positioned in tandem on each side of the vehicle, an axle connecting the two front wheels, an axle connecting the two rear wheels, and a spring suspension connecting the axles with the vehicle frame. With this type of a four wheel suspension at least two important problems arise. The first of these is that of preventing scrubbing, that is, sidewise slipping of the wheels as the vehicle travels about a curve, which scrubbing destroys rubber tires, and, secondly, that of avoiding severe torsional or twisting strains from being imposed upon the vehicle frame whenever the vehicle is traveling over rough or uneven terrain and the wheels are not all at the same elevation or height with respect to the frame.

It is the object of this invention to produce a four wheel spring suspension unit for a vehicle frame wherein neither the front nor the rear wheels of the unit will scrub the road while the vehicle is traveling a curve.

It is also an object of this invention to produce a four wheel spring suspension for a vehicle wherein the frame of the vehicle will not be subjected to severe twisting strains even though the wheels are traveling on rough ground and some of the wheels may be raised or lowered with respect to other of the wheels.

The spring suspension for achieving these objects is exemplified or illustrated by the specific structure shown and described below.

Fig. 3 is a rear elevation of the vehicle and four rear wheel spring suspension unit traveling over uneven ground.

Fig. 4 is a plan view of the four wheel spring suspension unit independent of or disassembled from the vehicle.

Fig. 5 is a detail fragmentary, longitudinal, vertical section through the four wheel spring suspension showing one of the springs and the tongue connecting the rear axle housing with the frame.

Fig. 6 is a section along the line 6—6 of Fig. 5.

Fig. 7 is a schematic showing illustrating the position of the various members of the suspension when one of the rear wheels is elevated.

Figure 1:
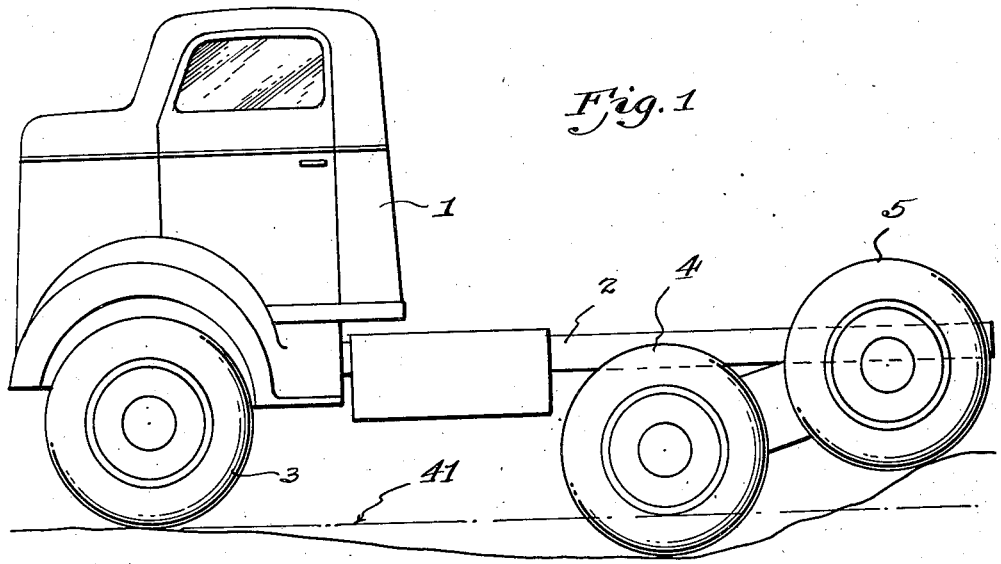
Fig. 1 is a side elevation of a motor vehicle showing my four wheel spring suspension unit on a motor vehicle or tractor wherein the uneven terrain has elevated the rear wheels and lowered the front wheels relative to the frame.

Referring more particularly to the drawings there is shown an automotive vehicle or tractor comprising a cab 1, frame 2 and front wheels 3. The front wheels 3 may be mounted in any conventional manner so that they can be turned for the purpose of steering the vehicle. The rear of the vehicle is suspended on four wheels by my novel spring suspension. Insofar as this invention is concerned, it is immaterial whether each wheel is a single wheel or a double wheel such as shown herein. The term "wheel" as used herein includes one wheel as well as a plurality of wheels which are tied together and rotate as a unit so that they serve the same function as a single wheel.

As herein shown the four wheel spring suspension comprises a pair of front wheels 4 and a pair of rear wheels 5. Each of the wheels 4 and 5 are dual. As herein shown for purposes of description, wheels 4 and 5 are driving or traction wheels for the vehicle. Therefore, the two front wheels 4 on opposite sides of the vehicle and the two rear wheels 5 on opposite sides of the vehicle are fixed on opposite ends of axle driving shafts 6. The one axle shaft is mounted in front axle housing 7 and the shaft for the rear wheels 5 is mounted in a rear axle housing 8. Power is supplied to the front wheels 4 and the rear wheels 5 from individual internal combustion engines (not shown), but connected to separate propeller shafts 9 and 10 which, through suitable differential gear trains independently mounted in differential housings 11 and 12, connect the propeller shafts 9 and 10 with the front and rear axles in the housings 7 and 8 respectively. The rear axle housing has fixed thereto a tongue 13 and the front axle housing 7 has fixed thereto a tongue 14. Tongues 13 and 14 are metal tubes and welded or otherwise fixed to their respective axle housings so that the longitudinal axis of each tongue is perpendicular to its respective axle housing. Each of the tongues at its forward end is arranged to be connected to the underside of the frame 2 forwardly of its respective axle housing by a ball and socket joint comprising a ball 15 fixed on the forward end of each tongue and a socket bearing 16 secured by bolts to the frame 2. Thus, tongues 13 and 14, due to their ball and socket connections with the frame, can pivot in any direction with respect to the frame 2.

The frame 2 is supported upon axle housings 7 and 8 by two sets of springs positioned beneath and on the right and left hand sides of the frame 2. The two sets of springs, as well as their connections with the frame and axle housings, are identical so the description of one applies to both. Each set of springs comprises a main spring 17 and a helper spring 18 each made up of a plurality of leaf springs as shown. The main spring 17 is pivotally supported on hangers 19 and 20 by means of bolts 21 passed through the lower ends of hangers 19 and 20 and the eyes at the ends of the springs 17. The ends of the helper spring 18 rest in, and have a sliding fit with, grooves 22 on the top side of hangers 19 and 20. Each hanger 19 and 20 comprises an upper portion 23 and a lower portion 24 secured together by bolts 25. The connection or suspension for each hanger 19 and 20 and its respective axle housing takes the form of a ball and socket joint so that each hanger is free to move or swivel universally with respect to its supporting axle housing. The ball and socket joint for each hanger comprises a ball 26 formed on the axle housing and the upper and lower hangers are formed with a bearing socket 27 which fit over and receive the ball 26. It should be noted that the hangers 19 and 20 are in the form of levers so that as axle housings 7 and 8 move toward and away from each other the hangers 19 and 20 pivot about their respective supports. Main spring 17 and helper spring 18 are bolted together on each side of the springs by a pair of U-bolts 29. A spacer plate 30 is clamped between the helper and main springs and a clamping plate 31 is positioned on top of the helper spring 18. The two U-bolts pass through the plate 31 and the nuts 32 are screwed on to the bolts 29 and tightened down against the clamping plate 31. Each U-bolt 29 also supports a bearing member 40 which is clamped by the U-bolt against the bottom face of main spring 17. Rocker shaft 33 is journaled at each end in a bearing support 40 so that the rocker shaft is free to rotate on its axis in bearings 40. The frame 2 is supported on the rocker shaft 33 at each side by plates 34 (Fig. 3). The plates are bolted to the frame 2 at their upper ends and bolted at their lower ends to the integral flanges 35 on the rocker shaft 33. Thus, the frame 2 is rigidly fixed to the rocker shaft 33.

Figure 2:
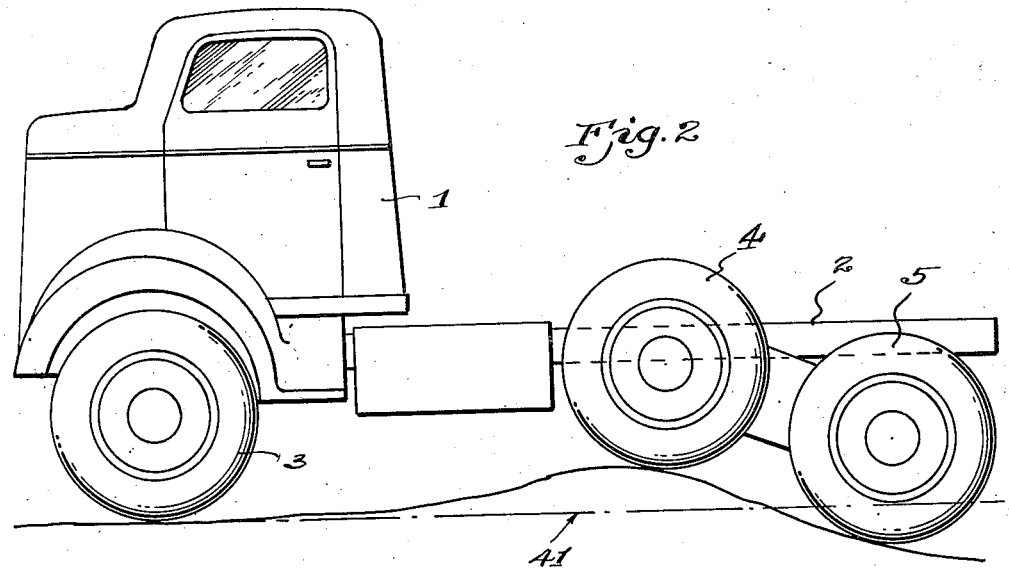
Fig. 2 is an elevation similar to Fig. 1 but showing the position of the frame when the front wheels of the suspension unit are raised and the rear wheels lowered with respect to the frame.

In the operation of the truck the four wheel tandem drive unit, above described, propels the truck along the road. The power is supplied from one engine (not shown) through propeller shaft 9 and universal joints (not shown) to the front wheels 4 and from another engine (not shown) through propeller shaft 10 and universal joints (not shown) to the rear wheels 5. The drawings illustrate the numerous positions that the tandem drive wheels 4 and 5 take in the course of propelling the truck over uneven ground. For example, in Fig. 1 the rear set of wheels 5 have been elevated above the front steering wheels 3 and the front driving wheels 4 have dropped below the elevation or position of the front steering wheels 3 but the frame 2 remains level. In Fig. 2 just the reverse has taken place; namely, the front wheels 4 are elevated above and the rear wheels 5 have dropped below the level of the front steering wheels 3 but the frame 2 remains horizontal. The wheels 4 and 5 freely adjust themselves from level road conditions to the positions shown in Figs. 1 and 2 because the spring suspension pivots about rocker shaft 33 in bearings 40 without disturbing the position of the frame 2.

Another condition of the four wheel tandem drive unit is illustrated in Fig. 3. As in Fig. 1 the ground level upon which the front steering wheels 3 rest is indicated by line 41. As viewed in Fig. 3, the rear right hand wheel 5 and the front left hand wheel 4 of the driving unit are on level ground 41, that is to say, these two wheels are rolling along on ground at the same elevation. The front right wheel 4 and the rear left wheel 5, however, are each rolling over ground at a higher elevation than the other two wheels as above described. Thus, the rear axle housing 8 is inclined downwardly from left to right whereas the front axle housing 7 is inclined upwardly from left to right, but the frame 2 remains horizontal as does the rocker shaft 33. However, it should be noted in Fig. 3 that the spring hangers 19 and 20 also remain vertical or perpendicular to the rocker shaft 33 but they have swiveled about their ball and socket joints 26 and 27 with the front and rear axle housings 7 and 8 respectively. Thus, the ball and socket joints between the spring hangers and their respective shafts have permitted the front and rear wheels of the drive to take the positions shown in Fig. 3 without transferring any torsional strain or twist to the frame 2 because the balls 26 are free to pivot or swivel in the sockets 27 of the hangers 19 and 20.

As shown in Fig. 6 the wheels supported at each end of the shaft 6 would necessarily be at the same level and hangers 19 are perpendicular to the axle 6 or housing 8, but in Fig. 3 note that the wheels 5 at opposite ends of the shaft 6 are at different levels which has caused hangers 19 to swivel on their ball and socket joints and hangers 19 now are inclined or not perpendicular to the housing 8.

In Fig. 3 on the right hand side, for example, front wheel 4 is elevated above rear wheel 5. The motion that takes place as the front right wheel rises above the rear right wheel (Fig. 3) is illustrated in Fig. 7. In Fig. 7 the front and rear wheel housings are indicated by circles 7 and 8 and the rocker shaft is indicated by the circle 33. The main spring is indicated by line 17 and the helper spring by line 18. The front and rear hangers are indicated by the lines 19 and 20. The bolts connecting hangers 19 and 20 with the main spring 17 are indicated by circles 21. In the full lines of Fig. 7 wheels 4 and 5 are at the same level. In the dotted lines of Fig. 7 front wheel 4 has been elevated above rear wheel 5. Thus, the left hand end of housing 7 is shifted upwardly to the dotted line position. This causes hanger 19 to swivel slightly on housing 7 and the springs 17 and 18 are swung upwardly about their supports on the rear hanger 20. It should be noted that the rocker bar 33, being supported midway between the point at which main spring 17 connects to hangers 19 and 20, is elevated only half the distance that left hand wheel 4 has risen above rear wheel 5 (Fig. 3). Since in Fig. 3 right rear wheel 5 has risen above the level of right forward wheel 4, the motion of the parts will be just the reverse of that shown in Fig. 7.

Figure 8:
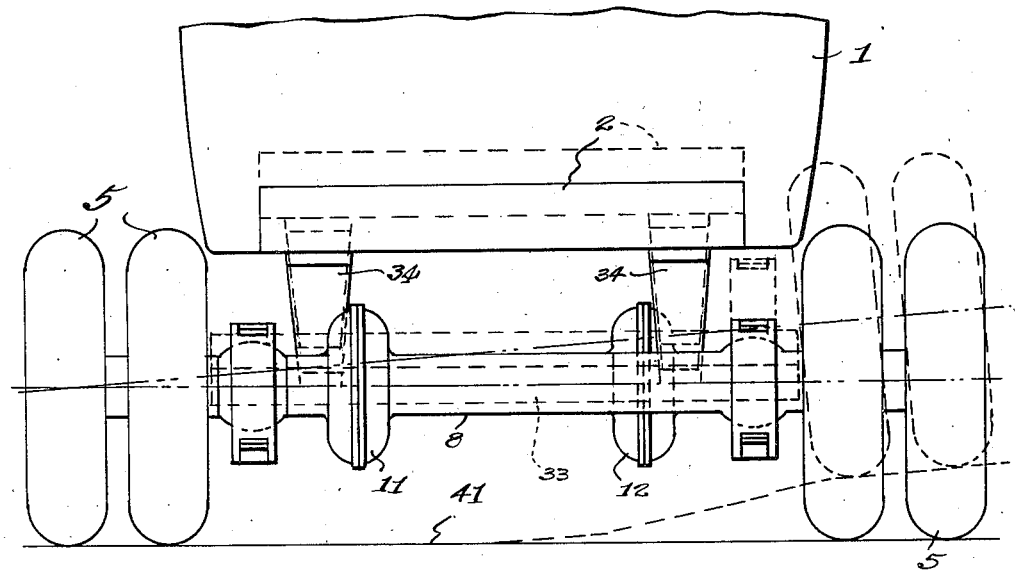
Figs. 8 and 9 are rear elevations of the vehicle showing different positions of the wheels and associated elements.
Figure 9:
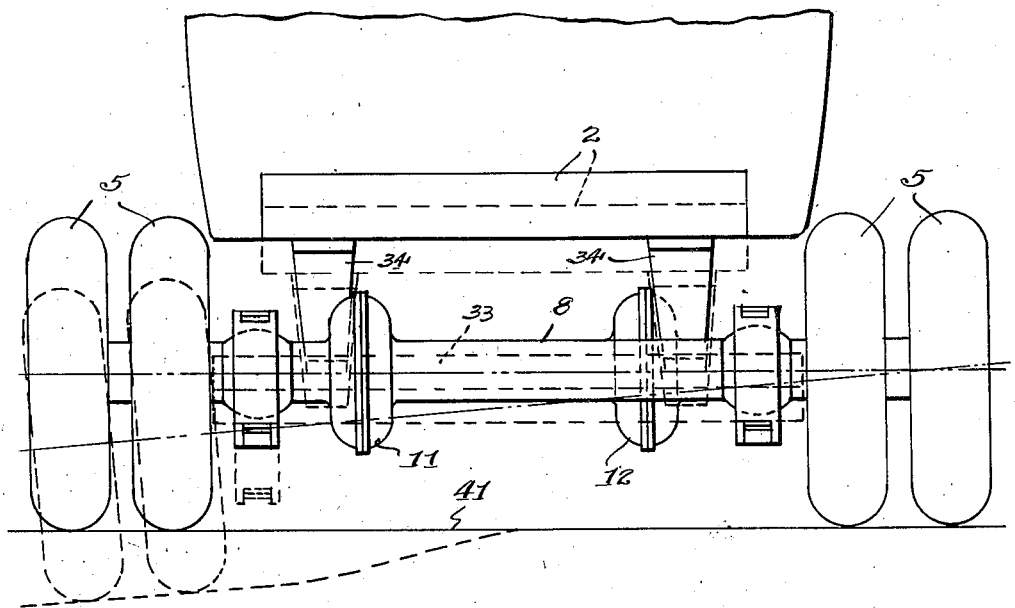

Figs. 8 and 9 are rear elevations in which three of the four wheels of the driving unit are on level ground. In Fig. 8 only the front right wheel has risen above the other three wheels whereas in Fig. 9 only the front left wheel has fallen below the level of the other three wheels. Note that in this condition the frame 2 remains horizontal but has risen one-half the distance that the front right wheel has risen in Fig. 8 and in Fig. 9 the frame 2 has lowered only one-half the distance that the front left wheel of the driving unit has lowered. Fig. 7 illustrates in the dotted lines the relative position of the right front and rear wheels in the position shown in Fig. 8 and the position of the right spring. Since in Fig. 8 rocker shaft 33 and frame 2 remain horizontal even in their elevated dotted line positions, therefore right hand spring will be bowed downwardly beyond the position shown in Fig. 5 and left hand spring, Fig. 8, will be bowed upwardly from the position shown in Fig. 5. Incidentally, in Fig. 5 the spring 17, 18 is shown in the position it assumes when the truck is loaded so that the spring is depressed somewhat. In the position shown in Fig. 9 left hand spring will be bowed downwardly between its supporting hangers 19 and 20 to a much greater degree than the right hand spring owing to the fact that front left wheel has dropped below the level of the other three wheels.

Figure 11:
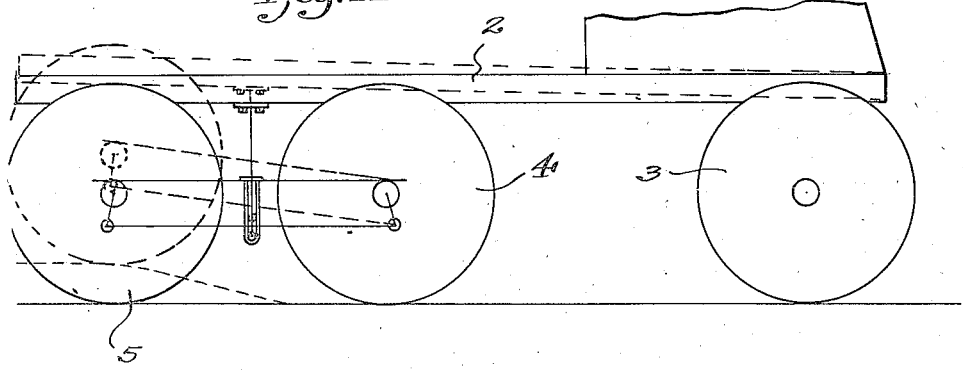
Figs. 11 and 12 are side elevational schematic showings illustrating different relative positions of the wheels and vehicle frame.

Fig. 11 is a side elevation illustrating the relative position of the frame 2 and the various members of the spring suspension where (in the full lines) all the wheels of the driving unit are on the same level and (in the dotted lines) where the two rear wheels of the driving unit are elevated above the front wheels 4 of the driving unit which are on the same level as the steering wheels 3.

Figure 12:
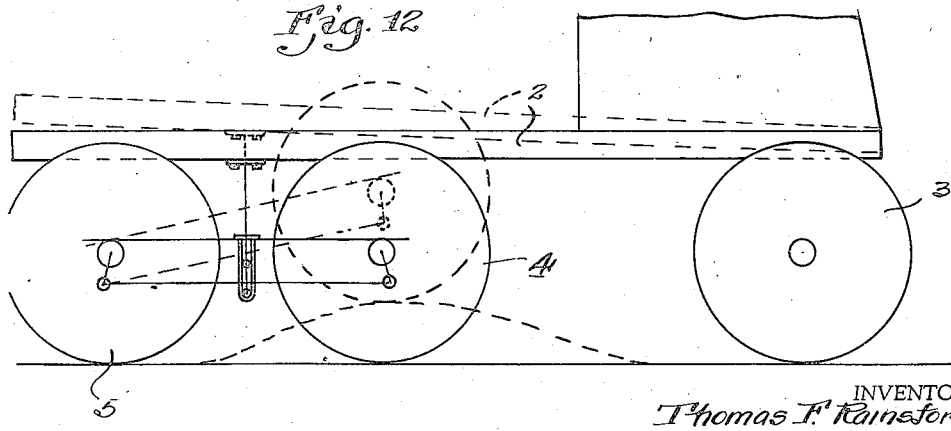

Fig. 12 illustrates (in the dotted line showing) the reverse of the conditions obtaining in Fig. 11; namely, the front wheels 4 of the driving unit have been elevated above the rear wheels 5 which are on the same level as the steering wheels 3.

Figure 10:
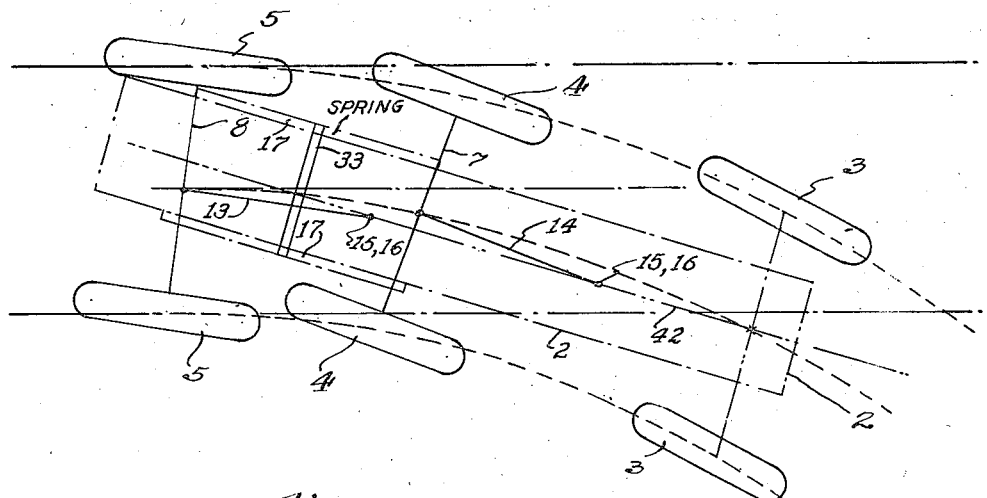
Fig. 10 is a plan schematic showing of the vehicle traveling along a curve.

Fig. 10 shows how a vehicle equipped with my tandem drive unit travels about a curve without scrubbing or sidewise slipping of any of the wheels of the driving unit on the road or pavement. The several elements are shown schematically and bear their respective numbers. As shown, the driver has turned front steering wheels 3 and the vehicle has progressed a certain distance along a curved line of travel. When the front wheels 3 are turned out of alignment with rear driving wheels 4 and 5, frame 2 follows the front axle and begins to turn. As frame 2 turns it swings out of alignment with the wheels of the driving unit, that is, the longitudinal axis 42 of the frame ceases to be perpendicular to the rear axle housings 7 and 8. Since the frame 2 is rigidly connected to the rocker shaft 33, rocker shaft 33 necessarily remains perpendicular to the axis 42 of frame 2. Since tongues 13 and 14 are each connected by a ball and socket joint 15, 16 with the frame 2 on its longitudinal axis, sockets 15 and 16, which travel with the frame, act through housings 7 and 8 to turn wheels 4 and 5 in the direction of the curve being traversed by the vehicle so that wheels 4 and 5 travel about the curve without scrubbing of the wheels. In Fig. 10 it will be noted that in negotiating a curve the wheels 4 and 5 on the inside of the curve move closer together whereas the driving wheels 4 and 5 on the outside of the curve move relatively further apart. This action is permitted by the swivel mounting of the hangers 19 and 20 on the axle housings 7 and 8. By referring to Fig. 5 it will be seen that if housings 7 and 8 travel away from each other, then the helper spring 18 will slide in its supporting grooves on hangers 19 and 20 and hanger 20 will swing clockwise and hanger 19 counterclockwise because they are rigidly connected by main spring 17. This is the action of the spring on the outside side of the curve. The action of the spring on the inside of the curve will be just the opposite, that is, housings 7 and 8 will move toward each other and, as viewed in Fig. 5, the upper part of hangers 19 and 20 will move toward each other sliding inwardly along the underside of helper spring 18 and at the same time hanger 20 will swing counterclockwise and hanger 19 clockwise about their supports on their respective axle housings.

I claim:

1. In a vehicle having a frame, a tandem wheel spring suspension unit for said frame comprising a pair of shafts positioned one in front of the other and transversely of said frame, wheels mounted at opposite ends of each of said shafts, springs bridging the space between said shafts, a swivel joint between each of the ends of said springs and the said shafts, a rocker shaft pivotally mounted on said springs and positioned parallel to and intermediate said shafts, and a support member connecting the rocker shaft with the frame whereby the said tandem wheel unit can tilt about said rocker shaft relative to said frame, a tongue rigidly connected to each of said shafts centrally thereof and perpendicular to said shaft, and a pivotal connection forwardly of its respective shaft between the end of each of said tongues and the frame whereby as the vehicle travels around a curve the turning of the vehicle frame acts through said tongues and shafts to turn the wheels in the direction of the curve and prevent scrubbing between the wheels and the road.

2. In a vehicle having a frame, a tandem wheel support unit for said frame comprising a pair of shafts positioned one in front of the other and transversely of said frame, wheels mounted at opposite ends of each of said shafts, springs bridging the space between said shafts, a ball and socket joint between each of the ends of said springs and the said shafts, a rocker shaft pivotally mounted on said springs and positioned parallel to and intermediate said shafts, a support member rigidly connecting the rocker shaft with the frame whereby the said tandem wheel unit can tilt about said rocker shaft relative to said frame, a tongue rigidly connected to each of said shafts, and a fixed pivotal connection forwardly of each shaft between the end of each of said tongues and the frame whereby as the vehicle travels around a curve the turning of the vehicle frame acts through said tongues and shafts to turn the wheels in the direction of the curve and prevent scrubbing between the wheels and the road.

3. In a vehicle having a frame, a tandem wheel support unit for said frame comprising a pair of shafts positioned one in front of the other and transversely of said frame, wheels mounted at opposite ends of each of said shafts, springs bridging the space between said shafts, a ball and socket joint between each of the ends of said springs and the said shafts, a rocker shaft pivotally mounted on said springs and positioned parallel to and intermediate said shafts, a support member rigidly connecting the rocker shaft with the frame whereby the said tandem wheel unit can tilt about said rocker shaft relative to said frame, a tongue rigidly connected to each of said shafts, and a ball and socket connection between the end of each of said tongues and the frame, said last mentioned ball and socket connection being positioned forwardly of its respective shaft and centrally of the frame whereby as the vehicle travels around a curve the turning of the vehicle frame acts through said tongues and shafts to turn the wheels and prevent scrubbing between the wheels and the road.

4. In a vehicle having a frame, a tandem wheel spring suspension unit for said frame comprising a pair of axle housings positioned one behind the other and extending transversely of the frame, springs at opposite ends of said housings bridging the space between said housings, hangers for supporting the ends of the springs on said housings, each hanger having a ball and socket bearing joint on its respective housing, a rocker shaft pivotally supported on said springs intermediate the said housings and parallel thereto, and means rigidly connecting the rocker shaft with the frame for supporting the frame on the rocker shaft, a tongue rigidly connected to each of said housings and extending forwardly therefrom, a swivel connection between the forward end of each of said tongues and the said frame whereby as the vehicle travels around a curve the turning of the vehicle frame acts through said tongues and housings to turn the wheels in the direction of the curve and prevents scrubbing between the wheels and the road.

5. In a vehicle having a frame, a tandem wheel spring suspension unit for said frame comprising a pair of members extending laterally of said frame and parallel to each other, wheels rotatably supported at the ends of each of said members, a pair of leaf springs spaced from each other bridging the space between said members and extending lengthwise of the frame, a hanger for each of said springs in the form of a lever having a ball and socket bearing joint connection with the said member, a pivotal connection between each hanger and an end of the spring beneath the said lateral members, a rocker shaft pivotally mounted on said springs and positioned between and parallel to said lateral members, and means for connecting the rocker shaft with the frame for supporting the frame on the rocker shaft, a tongue for each of said lateral members and rigidly affixed thereto, a ball and socket connection between each tongue and the frame positioned forwardly of the said lateral member whereby as the vehicle travels around a curve the turning of the frame acts through said tongues and lateral members to turn the wheels in the direction of the curve and prevents scrubbing between the wheels and the road.

6. In a vehicle having a frame, a tandem wheel spring suspension unit for said frame comprising a pair of members positioned in tandem and extending laterally of and beneath the frame, wheels rotatably mounted at the ends of said lateral members, spring support hangers adjacent the ends of said lateral members each in the form of a lever having a ball and socket joint connection with the said lateral members, two sets of springs spaced from each other and bridging the space between said lateral members, each set of springs extending lengthwise of the frame and comprising a main leaf spring pivotally connected at each end to the hangers below the said lateral members, and a helper leaf spring positioned above the main spring and slidably supported at each end on the hanger above the said lateral members, a rocker shaft positioned intermediate the said members and extending parallel thereto, a bearing support for each end of said rocker shaft, means for mounting said bearing supports on the springs intermediate their ends, and means connecting the rocker shaft with the frame for supporting the frame on the shaft.

7. In a vehicle including a frame and tandem axles pivotally mounted under one end thereof, means rigidly fixed with respect to each of said axles and swivably connected to said frame in advance of the corresponding of said axles substantially on the longitudinal center line of said vehicle, spring means mounted at each side of said frame, and a swiveled connection between said spring means and the corresponding ends of said axles permitting a limited universal movement of said ends of said axles independently of said spring means.

8. In a vehicle, in combination, a frame, dual axles under one end of said frame, a forwardly extending torque member on each of said axles and rigidly connected thereto, means connecting the forward end of each of said torque members to said frame for universal movement with respect thereto substantially on the longitudinal center line of said frame, a leaf spring centrally secured to said frame at each side thereof intermediate said axles, a pivotal connection between the outer ends of each of said leaf springs and the corresponding outer end of the corresponding of said axles arranged in vertically spaced relation with respect to the center of the corresponding of said axles, said connection affording a material but limited amount of free universally swiveled movement between the ends of said springs and all said axles, a second leaf spring at each side of said frame secured to said frame midway the length thereof, and a sliding connection between the outer ends of said second leaf springs and the corresponding portions of said axles.

9. In a motor vehicle, in combination, a frame, tandem axles under one end of said frame, a torque member rigidly fixed to each of said axles and extending forwardly therefrom, means connecting the forward end of each of said torque members to said frame for universal movement with respect thereto, a leaf spring mounted midway between its ends on each side of said frame between said axles, and a spring bracket mounted on the outer ends of each of said axles for universal swiveling movement relative thereto, connecting means for connecting the corresponding end of the corresponding of said leaf springs with said bracket to permit bodily shiftable movement of the outer end of said axle longitudinally of said vehicle about a horizontally extending pivotal axis, said pivotal connection providing a material but limited amount of universal movement between said ends of said springs and the corresponding ends of said axles.

10. In a motor vehicle, in combination, a frame, steerable tandem axles under one end of said frame, a steering member comprising a torque member rigidly fixed to each of said axles and extending forwardly therefrom, means connecting the forward end of each of said torque members to said frame for universal movement with respect thereto, a leaf spring mounted midway between its ends on each side of said frame between said axles, means connecting the outer ends of each of said axles with the corresponding end of the corresponding of said leaf springs for universal movement of such outer end of said axle about a fixed pivotal axis spaced vertically with respect to the center of the corresponding end of said axle, a second leaf spring pivotally mounted between its ends on said frame at each side thereof, and a slidable connection between the outer ends of each of said second springs and the corresponding end of the corresponding of said axles affording relative movement between them both longitudinally and transversely of the length of said frame.

11. In a motor vehicle, in combination, a frame, tandem axles under one end of said frame, a torque member rigidly fixed to each of said axles and extending forwardly therefrom, means connecting the forward end of each of said torque members to said frame for universal movement with respect thereto, a leaf spring mounted midway between its ends on each side of said frame between said axles, a member mounted upon the outer end of each of said axles for universal movement with respect thereto, and a pivotal connection between each outer end of each of said springs and the said member on the corresponding end of the corresponding of said axles having an axis vertically spaced with respect to the center of the corresponding ends of said axles and affording bodily shiftable movement of said outer ends of said axles both longitudinally of said frame and transversely of the length thereof.

12. A tandem axle vehicle, including a frame, spaced tandem axles mounted on said frame for pivotal movement relative thereto, a steering arm secured to each axle and connected to said frame for universal movement about a fixed center thereon, a spring secured to each side of said frame, a spring bracket mounted on each end of each of said tandem axles for universal movement about a fixed center thereon, and means connecting each one of the ends of said springs to one of said spring brackets.

13. A tandem axle vehicle as claimed in claim 12 and further characterized in that the said spring brackets each comprises a ball member fixed on the axle housing, a socket member surrounding said ball and spring engaging members secured to said socket member.

14. In a vehicle having a frame, a tandem wheel spring suspension unit for said frame comprising a pair of shafts positioned in tandem, springs bridging the space between said shafts, a ball and socket joint between the ends of said springs and the said shafts, a rocker shaft pivotally mounted on said springs and located between the said shafts, and means connecting the rocker shaft with the frame for supporting the frame on the rocker shaft, a tongue rigidly connected to each of said shafts, a pivotal connection between the forward end of each of said tongues and the said frame whereby as the vehicle travels around a curve the turning of the vehicle frame acts through said tongues and shafts to turn the wheels in the direction of the curve and prevent scrubbing between the wheels and the road.

THOMAS F. RAINSFORD.

REFERENCES CITED

The following references are of record in the file of this patent:

UNITED STATES PATENTS

| Number | Name | Date |
|---|---|---|
| 1,743,892 | Hylton | Jan. 14, 1930 |
| 1,886,349 | Moreland | Nov. 1, 1932 |
| 1,936,834 | Fageol | Nov. 28, 1933 |
| 2,272,572 | Merry | Feb. 10, 1942 |
| 2,269,728 | Mills | Jan. 13, 1942 |

FOREIGN PATENTS

| Number | Country | Date |
|---|---|---|
| 660,794 | German | June 2, 1938 |